A. G. DAVIS & M. FLANDERS.
NUT LOCK.
APPLICATION FILED NOV. 23, 1908. RENEWED MAY 12, 1911.

997,757. Patented July 11, 1911.

WITNESSES.

INVENTORS.

ATTORNEY.

UNITED STATES PATENT OFFICE.

ALBERT GALLATIN DAVIS AND MAX FLANDERS, OF PUEBLO, COLORADO.

NUT-LOCK.

997,757. Specification of Letters Patent. Patented July 11, 1911.

Application filed November 23, 1908, Serial No. 464,164. Renewed May 12, 1911. Serial No. 626,828.

*To all whom it may concern:*

Be it known that we, ALBERT GALLATIN DAVIS and MAX FLANDERS, citizens of the United States of America, residing in the city of Pueblo, in the county of Pueblo and State of Colorado, have invented a certain new and useful Improvement in Nut-Locks, of which the following is a specification.

Our invention relates to improvements in nut locks, and our object is to produce an inexpensive, simple and positive lock for general utility wherever bolts and nuts are used and safety of fastenings desired, and which may be used with the ordinary form of nut. We attain these objects by the device illustrated in the accompanying drawings in which—

Figure 1:
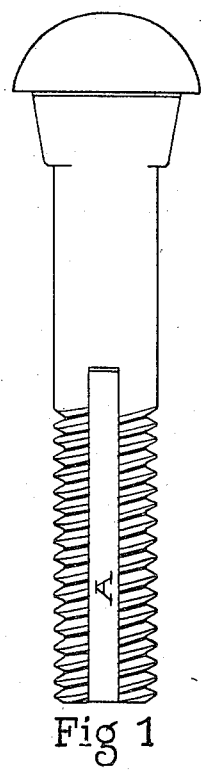
Figure 2:
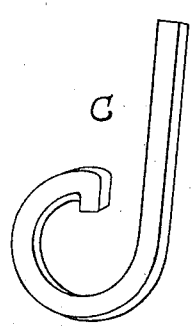
Figure 3:
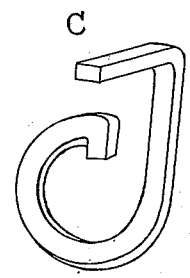
Figure 4:
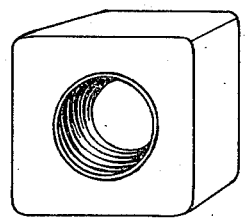

Figure 1 is a side view of a bolt with a groove A therein; Fig. 2 is a perspective view of the locking device with the nut locking finger C in its original form prior to using; Fig. 3 is a similar view of the locking device with the nut locking finger C bent to lock the nut; Fig. 4 is a similar view of the nut to be applied to the bolt, and Fig. 5 is a similar view showing the nut on the bolt and the nut locking device applied thereto, so as to positively lock the nut upon the bolt.

Figure 5:
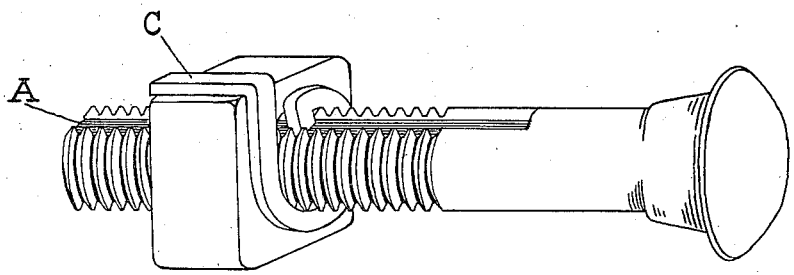

The locking device may consist of a piece of wire or of soft steel or any malleable or flexible metal or other suitable substance, preferably square in cross-section, the body of which is bent or curved as shown in the drawings, with a short spur or lug bent inwardly in the plane of said body to fit the groove A of the bolt as shown in Fig. 5, and the ring portion thereof may be made of such diameter that it fits the bolt to which it is to be applied. The bolt must have the groove A in order to admit the spur or lug of the nut locking device.

In applying the invention to its intended purpose, the device of Fig. 2 is appropriately engaged upon the bolt, the inwardly extending lug thereof occupying the groove A of the bolt, Fig. 1; the nut is then applied to its desired position upon the bolt and the nut locking device is then fastened by bending the finger C over upon the nut so as to overlie one of the faces thereof as shown in Fig. 5.

Having thus described our invention, what we claim is:

The combination of a threaded bolt having a longitudinal groove, a threaded nut engaging the same, a locking device consisting of a narrow curved strip of malleable material substantially surrounding the bolt in close proximity thereto and having one end bent inward to engage the groove and the other end extending outward with respect to the bolt, its extremity being bent rearward to engage or overlie one of the outer faces of the nut.

In testimony whereof, we affix our signatures to this specification in the presence of two subscribing witnesses.

ALBERT GALLATIN DAVIS.
MAX FLANDERS.

Witnesses:
JOHN A. MARTIN,
GRACE BENNING.

---

Copies of this patent may be obtained for five cents each, by addressing the "Commissioner of Patents, Washington, D. C."